Patented June 21, 1932

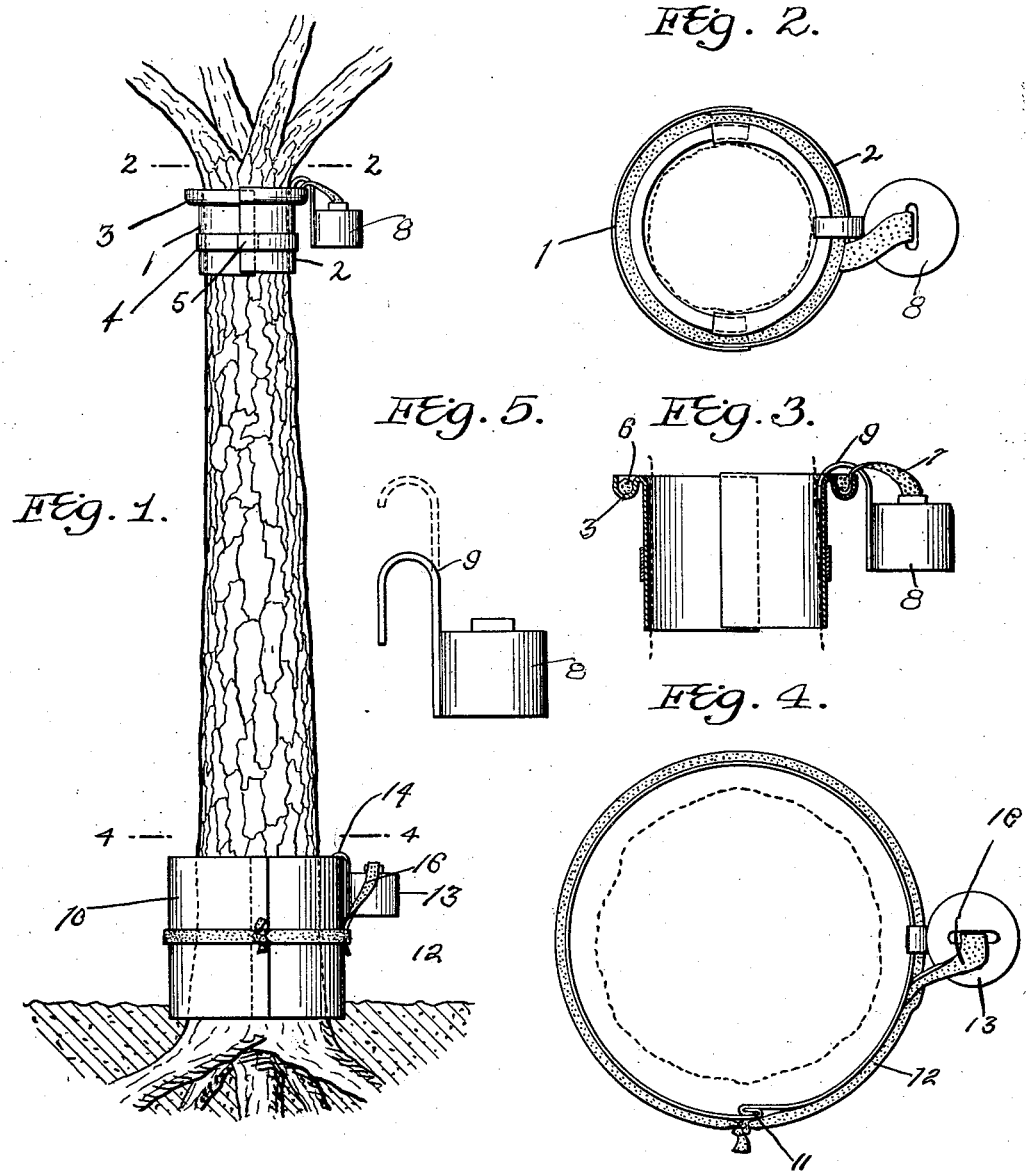

1,863,672

UNITED STATES PATENT OFFICE

ALBERT T. REPP, OF GLASSBORO, NEW JERSEY

INSECT BARRIER FOR TREES

Application filed July 18, 1931. Serial No. 551,765.

This invention relates to the eradication of horticultural insects, and particularly to the control of the coddling moth in orchards.

The life habits of the coddling moth are well known. In the spring, in April or May, for example, according to latitude, the moth which has pupated during the winter in a cocoon beneath the bark, emerges and deposits eggs on the leaves. The eggs hatch in about eleven days and the young larvae enter the newly formed fruit in which it remains for a period of about twenty days until it has attained its full growth. In the meantime, however, some of the apples may have fallen from the tree to the ground with the larvae within; and when the larvae attains adult size it crawls back to the trunk, or larger limbs, and pupates for a period of two weeks. In the case of those apples which remain on the tree, the adult larvae crawls to the bark of the trunk or limbs and pupates. The merging moth of this brood lays eggs generally upon the fruit itself, which by this time is quite large. The larvae of this brood, upon hatching, enter the fruit and remains there for the full period of growth. Some of the fruit may fall necessitating that the full grown larvae must return to the trunk by way of the ground. The larvae in those fruit which remain on the tree merely crawl down to the trunk and go into pupation, this time constructing the cocoons beneath the bark in preparation of the winter and passing most of the winter in the cocoon in the larval state.

Thus there are two or more broods annually. The life cycle of the summer brood being longer than the life cycle of the spring brood, but in each brood a part of the larval existence of the insect is spent in the fruit itself and the return of the larvae to the trunk, either by way of the ground, in the case of those fruit which have fallen, or by way of the limbs, in the case of those fruit which remain on the tree, can be prevented, and the life cycle of the insect is interrupted and it can be eradicated.

The object of the present invention is to provide a barrier both to prevent those larvae which have fallen with the fruit from returning to the trunk and to place a fatal obstruction in the way of those larvae which travel down the limbs from the fruit remaining on the tree, for purposes of pupation.

Another object of the invention is to provide a barrier of the type disclosed, charged with an insecticide which will destroy the life of such larvae as may try to cross the barrier.

Other objects of the invention will appear as the following description of a preferred and practical embodiment thereof proceeds.

In the drawing accompanying the specification, and in which the same characters of reference have been used throughout the several figures to designate identical parts:

Figure 1 is a view in elevation of that portion of a tree included between the ground and lower limbs, showing the device of my invention applied thereto;

Figure 2 is a perspective view of the upper barrier; that is to say, the one designed to prevent the migration of the larvae from the fruit to the trunk by way of the limbs;

Figure 3 is a perspective view of that form of barrier which prevents the return of the larvae from the fallen fruit by way of the ground to the trunk;

Figure 4 is a development of the barrier shown in Figure 3; and

Figure 5 is a detail showing the adjusting feature by which the height of the oil reservoir may be adjusted.

Referring now in detail to the several figures, and first adverting to that form of the barrier which is shown in the upper part of Figure 1; the numerals 1 and 2 represent the matching halves of a cylindrical member of non-absorptive material and preferably of metal, each half being formed at its upper end with a trough 3, the troughs of the halves telescoping slightly when the halves are in matched position to form a complete annular trough adapted to surround the tree. A band 4 having interlocked ends 5 surrounds the halves 1 and 2 holding them in close contact with the tree. The interlocking joint 5 is of such flexible nature as to spread somewhat to permit engagement of the band 4 under the pressure of the growth of the tree.

A wick 6 is seated in the trough 3 and is connected by means of a wick 7 with a reservoir 8 adapted to contain a suitable insecticide, such as a light grade of oil.

Since the flow of oil along the wick 7 to the wick 6 is influenced by atmospheric conditions, being very slow in rainy weather, it is desirable to adjust the level of the reservoir 8 with respect to the wick 6. This adjustment is accomplished by means of a bendable metallic lug 9 secured to the reservoir 8 and having its end adapted to be bent into a hook and slipped behind the barrier supporting the reservoir 8 in position. When it is desired to change the level of the reservoir, this may be easily accomplished by bending the metallic lug 9 at a suitable point so as to lengthen or shorten its effective length as required by circumstances.

The matching halves 1 and 2 of the barrier are designed to fit the trunk closely just below the lower limbs so that when the larvæ attempt to crawl across said barrier it must necessarily cross the trough 3 and come in contact with the wick 6, the oil or other insecticide coming in contact with the body of the larvæ and killing it. In view of the close fit of the halves 1 and 2, it will be impossible for the larvæ to crawl down the trunk between the trunk and the barrier.

Referring now to that form of the invention shown in the lower portion of Figure 1, which comprises a sheet 10 of flexible non-absorptive material, such for instance as metal, adapted to be wrapped around the tree and having at its free ends interlocking folds, as shown at 11. Since the trunk of the tree usually increases in diameter at the ground level, the cylindrical shield formed by this sheet may be slightly larger in diameter than the trunk of the tree so that its lower edge may press against the ground. It should be able either to enter the ground for a short distance or should have the earth heaped against it so that the larvæ can not crawl beneath it and thus gain access to the trunk. A wick 12 encircles the shield and an oil reservoir 13, which may be similar to the oil reservoir 8, is suspended by a lug 14 bent in a hook which engages the upper end of the shield 10 and connected to the wick 6 by the wick 16. The lug 14 is capable of being bent at any desired point so as to effect the same kind of adjustment, and for the same purpose as has been described in connection with the oil reservoir 8.

It is apparent from the above description that the larvæ crawling from the fallen fruit can not reach the trunk of the tree without crossing the deadly barrier constructed by the wick 12, charged by capillarity with oil or other insecticide from the reservoir 13.

It will thus appear that the larvæ from either brood is excluded from the trunk of the tree and, therefore, prevented from pupating; and the life cycle being thus interrupted, the insect will be in part eradicated.

While I have in the above specification, described what I believe to be practical embodiments of my invention, it is to be understood that the details of construction, as described and illustrated, are merely by way of example, and not to be considered as limiting the scope of the invention which is defined in the appended claims.

What I claim is:

1. Insect barrier for trees comprising an impervious sheet adapted to encircle the tree, a wick carried circumferentially by said sheet, a reservoir for supplying insecticide to said wick, and means for adjusting the height of said reservoir relative to said wick.

2. Insect barrier as claimed in claim 1, the means for adjusting the height of the reservoir comprising a bendable metal lug secured to said reservoir to be hooked over the top edge of said sheet.

In testimony whereof I affix my signature.

ALBERT T. REPP.